United States Patent [19]

Gorike

[11] Patent Number: 4,904,078
[45] Date of Patent: Feb. 27, 1990

[54] EYEGLASS FRAME WITH ELECTROACOUSTIC DEVICE FOR THE ENHANCEMENT OF SOUND INTELLIGIBILITY

[76] Inventor: Rudolf Gorike, Sternwartestrasse 57c, Vienna, Austria

[21] Appl. No.: 207,272

[22] Filed: Jun. 15, 1988

[30] Foreign Application Priority Data

Mar. 22, 1984 [AT] Austria ................................. 972/84

[51] Int. Cl.$^4$ .......................... G02C 1/00; H04R 25/00
[52] U.S. Cl. .................................... 351/158; 381/68.1
[58] Field of Search .............. 351/158, 123; 381/68.1, 381/68.5

[56] References Cited

U.S. PATENT DOCUMENTS

| | | | |
|---|---|---|---|
| 1,820,357 | 8/1931 | Lindstrom et al. | 179/107.5 |
| 2,207,705 | 7/1940 | Cox | 351/158 |
| 2,792,457 | 5/1957 | Zapelloni | 179/107 |
| 4,490,585 | 12/1984 | Tanaka | 381/68 |

Primary Examiner—P. M. Dzierzynski
Attorney, Agent, or Firm—McGlew & Tuttle

[57] ABSTRACT

An eyeglass frame and electroacoustic device combination for the improvement of natural hearing has temples that contain or carry electronic and electroacoustic devices. To enable persons with reduced hearing to again be able to follow a conversation in noisy surroundings, e.g. to concentrate on a partner during a cocktail party situation, to clearly understand speech in reverberant rooms, to concentrate on sound from a specific direction, to enjoy again theater and concert performances, each temple of the eyeglass frame comprises, directly at its front end, a directional microphone. The direction of maximum sensitivity extends to the front of the wearer, and its direction of minimal sensitivity faces toward the electroacoustic transducer at the rear end of the temple, near the ear of the wearer. This electroacoustic transducer is arranged at the rear end of the temple on an arm of a temple. In the position of use, the transducer is applied gently against only parts of the auricle, possibly also with the interposition of a foam member, which must be acoustically fully transparent. This provides access for the natural sound from the users surrounding to the auditory meatus. This direct and undistorted access is necessary for the buildup of pinna transfer functions which help perceive the directional information of the sound source(s).

15 Claims, 3 Drawing Sheets

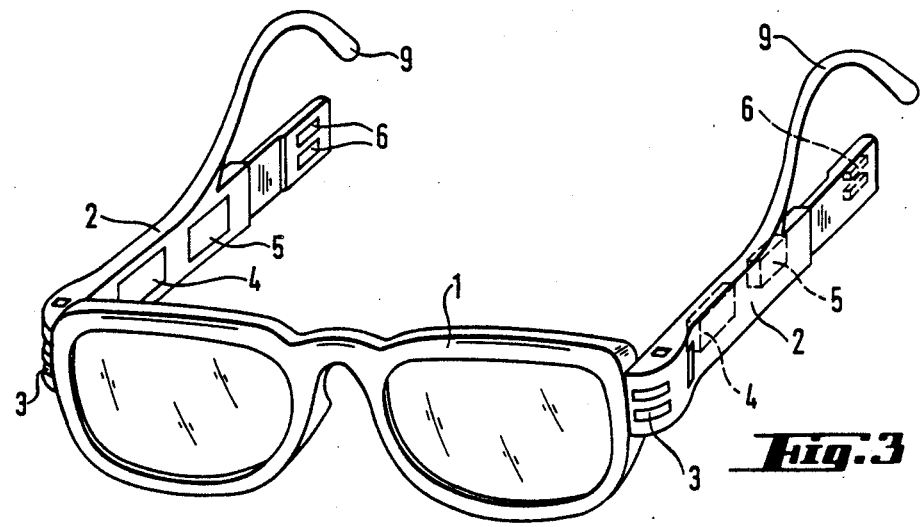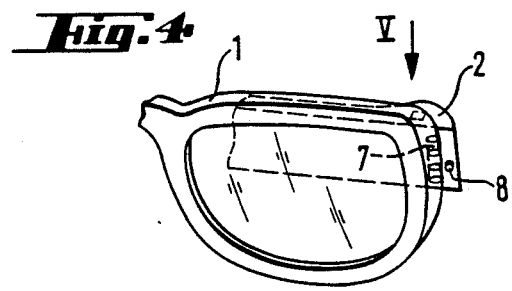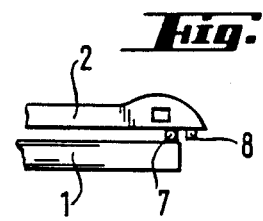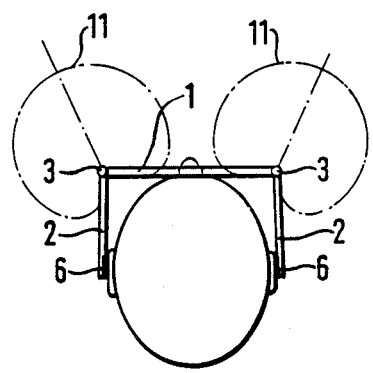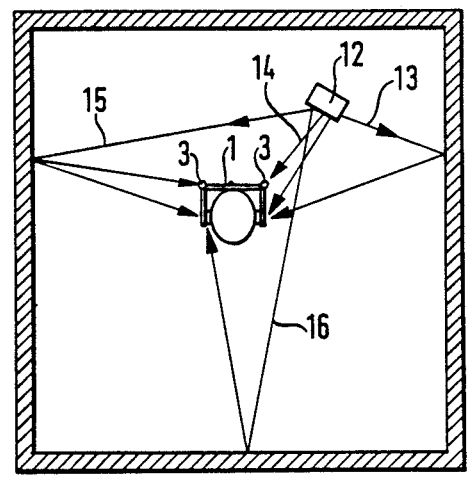

EYEGLASS FRAME WITH ELECTROACOUSTIC DEVICE FOR THE ENHANCEMENT OF SOUND INTELLIGIBILITY

CROSS-REFERENCE TO RELATED APPLICATIONS

This application is a continuation-in-part of application Ser. No. 711,400 filed Mar. 13, 1985 now abandoned.

BACKGROUND OF THE INVENTION

Field of Invention

The present invention relates in general to acoustic perception enhancement systems and in particular to a new and useful eyeglass frame with an electroacoustic combination particularly adapted for use by persons having high frequency hearing loss.

Hearing aids for the hard-of-hearing which are installed in an eyeglass frame and are generally referred to as hearing glasses, are known from and described in the U.S. Pat. Nos. 2,207.585 to Cox, U.S. Pat. No. 2,792.457 to Zappeloni, U.S. Pat. No. 4,409.585 to Tanaka, U.S. Pat. No. 1,820.357 to Lindstrom, Austrian Pat. Nos. 245.647 and 318.033; as well as in the German AS's 1,188.140; 2,105.535 and 2,236.968; and in the German OS's 2,330.073; 2,361.595; 2,337.078; 2,401.962 and 2,948.847. All these hearing glasses are equipped with high amplification, to make it possible for the hard-of-hearing to communicate with the world around them. The frequency response of the known hearing aids is evolved from the result of an audiometric measurement of the hearing loss, and the transmitted and amplified frequency range extends from the low to the high and highest frequencies. To avoid, to a large extent, an acoustic feedback between sound receiver and transducer, it is necessary not to allow the sound which is radiated into the inner ear, to get outside the ear. This is achieved, in general, by means of a plug which is tightly fitted in the ear canal. With such a tightly fitting plug natural hearing is not possible any more. In the patent of Cox either bone conduction devices or miniature headphones are mentioned, which, according to knowledge in 1936, are tightly fitting the ear. The lens, used as the pickup element, has a bi-directional sensitivity enhancing acoustic feedback between pickup and reproducer, which can be avoided only by a tightly fitting transducer plug. Lindstrom describes a device for blind people, with photocells in place of microphones, an arrangement that cannot create any feedback. All other above mentioned patents make use of ear plugs tightly fitted to the ear canal.

Now besides that group of persons whose hearing loss is so great that communication with them, without a hearing aid, is difficult if not impossible, there is also a very large group of mostly older persons whose hearing ability is quite sufficient for everday life but shows a certain inability to concentrate on sound from a specific direction. For such persons a conventional hearing aid does not help because present day hearing aids are not based on psychoacoustic considerations.

The majority of persons with only slight hearing deficiency can still hear most sounds but cannot concentrate on sound from a specific direction, especially under conditions where different sounds exist at the same time and originating from sources in different directions as happens during a cocktail party or speech in reveberant rooms or just any sound in a noisy surrounding as with street traffic, or in any concert hall or theater. Concentration on a specific sound from a specific direction in a soundfield with other sound coming from other directions, is only possible with natural hearing. Natural hearing requires transmission to the brain of interaural time and intensity differences as well as undistorted pinna transfer functions.

Present-day hearing aids as well as those covered by patents (see above) but not utilized, can not fulfill these requirements. This invention aims at bringing natural hearing undistorted and unimpeded to the brain.

All those hearing aids and patented designs have only one aim: to amplify. Most designs have facilities to adapt the amplification values at different frequencies to the deficiencies of the ear of the hard-of-hearing. E. W. Johnson, Dir. of Clinical Audiology for the Otologic Medical Group in Los Angeles, Calif. has conducted a study on 500 consecutive fittings of intracanal hearing aids, after having fitted such an aid to president Reagan. This study showed:

1. In order to correct not only the frequency-dependent level deficiencies, binaural fitting is necessary.
2. Intra-canal aids create many problems: Of the 500 cases, 168 complained mainly about occlusion, but also about internal feedback, And 90 more could not use the hearing aids for reasons of inflammation etc.
3. Audiometric measurements showed that 50% have the same hearing loss and same frequency response.

This study was reported in Audiological Acoustics, Vol. 24, No. 6, Dec. 1985, p. 158–188.

SUMMARY OF THE INVENTION

The present invention enables persons with reduced hearing ability to regain the ability to distinguish speech, music and other sounds by directional selection of the desired sound out of many sounds around them. The invention further avoids most problems other hearing aids are creating, like inflammation with all plug-type aids including the intracanal aid, acoustic feedback loss of directional perception, inability to concentrate on desired sound against noise and undesired sound etc.

Another important point of the invention is its cosmetic advantage (the hearing deficiency is perfectly well camouflaged), because of its combination with eyeglasses.

According to the invention, all the advantages are achieved in that each arm of the eyeglass includes, directly at its front end, a directional microphone with highest forward sensitivity and lowest sensitivity in the direction of the reproducer mounted at the rear end of the arm in such a way as to gently apply without pressure against the auricle, even without touching it, so as to enable the natural un-amplified lower frequency part of the sound to have access to the pinna and the auditory meatus. The frequency range of the entire electroacoustic device is limited to frequencies above 1 kHz.

The user of the eyeglass according to the invention thus hears the low and medium frequencies in the natural way, without amplification, and hears the highest frequencies amplified in such a way that the interaural time and intensity differences as well as the effect of the pinna transfer functions are reaching the brain. Acoustic feedback between the directional microphones at the front of the eyeglass and the transducer near the ears is avoided to a great extent so that even higher amplification is possible, as compared with conventional hearing aids.

Also according to findings by Johnson (as mentioned above), that 50% of persons with slightly impaired hearing have all the same deficiency, namely about 20 to 70 dB loss at frequencies between 2 and 4 kHz, this amplification of frequencies above 1 kHz is justified. Arrangements for "tone control" make little sense for the invention, since they trim substantially only the high frequencies from the top.

It should be clearly understood that the invention aims at increasing the concentration ability of the brain as to the directive selection of sound incidence as compared to the adaptation of frequency dependent loss of hearing sensitivity of all other patents and practical hearing aids on the market.

The device according to the invention may be an integral part of the eyeglass arm or it may be incorporated into an individual housing that attaches to the eyeglass arm of any existing conventional eyeglasses. Appropriately flexible joints may be used for the connection of essentially rigid parts, so that the direction of the radiated sound is always adjustable relative to the auditory meatus.

Although the danger of acoustic feedback between microphones at the front and the transducers near the auditory meatus is almost non-existant, a time delay between microphones and transducers may be incorporated, also for psychoacoustic considerations. This time delay may be in the magnitude of the acoustical delay of sound, which is approximately 0.3 ms for the distances covered. Other values may add to the directivity of the device when delay times are used which enhance the Haas effect (the sound source seems to be in the direction of first wave front).

Batteries would usually be of a rechargeable type which would power the device for at least 24 hours, but provision could be made for an off-switch automatically disconnecting the batteries when the eyeglasses are folded up. Another possibility is the use of a cable which doubles as an eyeglass lanyard (as often used to protect glasses from being dropped), with a connector on one side in the shape of a battery that can be inserted in place of the battery, and a small battery box on the other side, to be worn in a clothing pocket or around the neck.

Obviously, for psychoacoustic reasons, natural hearing can be restored only with a binaural device. Consequently the invention refers to an eyeglass on which both arms are equipped with identical devices on both sides, which however may be adjusted for different amplification gains by built-in adjustable potentiometers.

It is a further object of the invention to provide an eyeglass and hearing aid combination which is simple in design, rugged for use and economical to manufacture.

The combination with eyeglasses has more advantages:

Usually older persons with hearing deficiencies also have impaired eyesight and

Eyeglasses are already cosmetically appealing while hearing aids are not. Therefore a combination of both solves in an almost ideal way perception problems concerning sight and hearing.

An advantage of the invention as compared to the other similar devices is that it does not only transfer to the ears an amplified signal, but also all directional information, something absent in all other hearing aids patents and existing types, by making use of interaural time and intensity differences and by not obstructing the pinna with auditory meatus for the buildup of the so-called pinna transfer functions. Only in this way is the human brain in the position to concentrate on desired sound and disregard undesired, usually disturbing, sound.

The various features of novelty in design and function which characterize the invention are pointed out in the claims annexed to and forming part of this disclosure. For a better understanding of the invention, its function and operating advantages attained by its use, reference is made to the accompanying drawings and descriptive matter in which a preferred embodiment of the invention is illustrated.

BRIEF DESCRIPTION OF THE DRAWINGS

In The Drawings

FIG. 3 is perspective view of a combination eyeglass and hearing aid according to the invention.

FIG. 4 shows part of the eyeglass in the folded position

FIG. 5 gives a top view of the structure shown in FIG. 4

FIG. 6 shows in a top view the directionality of the microphones and the equivalence of the distance between microphones and between hearing transducers FIG. 7 in a top view indicates the directional effects of sound supplied from a source to a user wearing the inventive device.

DESCRIPTION OF THE PREFERRED EMBODIMENT

Figure 1:
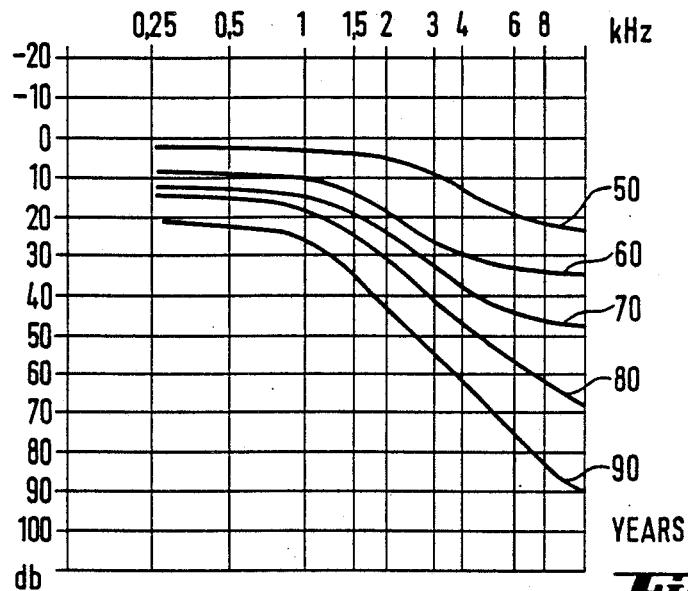
FIG. 1 and FIG. 2 are hearing losses in the frequency domain, for men and for women, respectively, with age.
Figure 2:
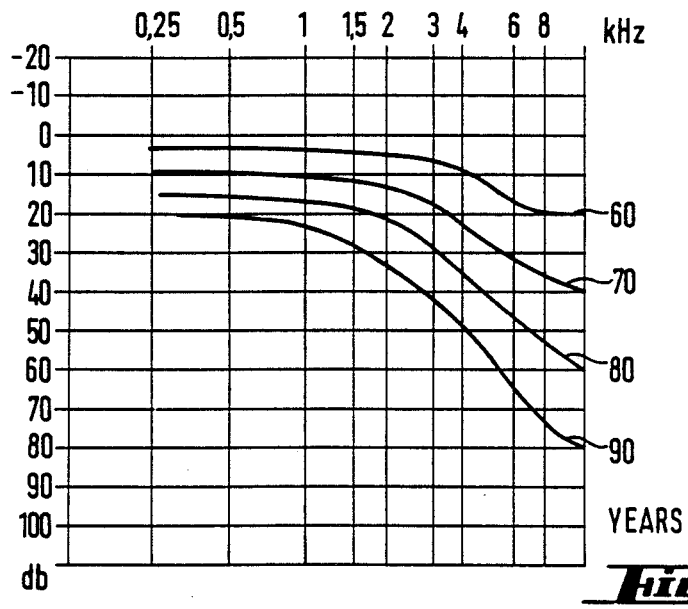

Since the hearing loss expressed in frequency-dependent sensitivity increases quite much at the higher frequencies only, with age, as shown in FIGS. 1 and 2, directional concentration becomes more difficult, while it is still enough for every-day communication as long as noise, reverberation or a multitude of sound sources do not exist. However, with noise, reverberation, listening to more than one sound source (cocktail party, etc.) and to a musical performance, the required concentration on the desired sound is not possible any more, as it was in younger age.

To help people in such a situation it is necessary to restore the directive information from the sound source, an information which is on top of the content of the sound itself. As mentioned above, this directive information comprises interaural time and intensity differences and of the pinna transfer function, as has become known only in recent years.

The inventive hearing aid therefore seeks to receive this directive information and bring it via the ears to the brain of the eyeglass wearer for further processing.

The inventive eyeglasses comprise an eyeglass frame as shown in FIG. 3 and marked 1. It comprises 2 temples 2 in or on which the acoustic and electronic parts 3,4 and 6 are accommodated. As the 2 temples 2 are identical in this respect, only one of the temples 2 will be considered in the following. In principle the invention hearing aid comprises the same devices as the known hearing aids, that is, a microphone, an amplifier, a transducer, and batteries. The difference however reside in the function and the special arrangements or construction of these elements.

Thus, for example, the microphone 3 is a directional element which should be mounted in such a way that the distance between the microphone on the right temple and that on the left temple is equivalent to the distance between the transducers in order not to distort the interaural time differences. The directions of the maximum sensitivities of these microphones may inclose an angle of 0 to 15 degrees with the forward plane of the eyeglass as indicated in FIG. 6 in order to pick up the correct or even slightly amplified interaural intensity differences. The rear part of the temple is hooked over the users ear. The actual temple of the inventive eyeglass however ends in a housing containing transducer 6. This design is not essential to the invention. Alternatively for example, an arrangement may be provided where the temple continues in a bend, and the electroacoustic transducer which delivers the sound, may be accommodated in an arm beginning at the temple an armlike housing or the like. What is however essential is that the part of the temple 2 carrying or containing the transducer 6 does not, in the position of use of the eyeglass frame according to the invention, close off the auditory meatus, but at most applies lightly against the ear, for in the spirit of the invention also the natural, direct and unamplified sound from the users surrounding is to have free access to the ear without disturbing the pinna transfer functions.

In FIG. 3 the amplifier is denoted with 4 and the battery with 5. The battery may alternatively be mounted in a continuation of the extension 9, or in a different version, in a separate box connected to the eyeglass frame by a cable, which may be incorporated into a protective eyeglass lanyard.

As has been mentioned at the beginning, to reduce the tendency of acoustic feedback between microphone 3 and transducer 6 it is appropriate and of advantage to provide the electronic system with a delay element, so that the natural sound waves coming from the front and directly entering the ear arrive approximately at the same time as the sound signals received by the microphone 3 located farther in front, which signals are to be radiated by the transducer in as nearly as possible the same phase as the sound waves reaching the ear directly.

Avoidance of feedback between microphone and transducer is achieved mainly by employing microphones with a high front-to-back ratio of sensitivity and a transducer of the open-principle variety with a strong near-field of sound.

To save battery life it is of advantage to provide, at the joints of the eyeglass frame which connect the lens mounts with the temples 2, mechanical switches in miniature design which interrupt the power supply when the temples are folded. In FIGS. 4 and 5 the arrangement of such a switch is illustrated in detail. Such a switch is actuated by a pin 8, which, when the temple is folded, protrudes therefrom and interrupts the battery circuit inside the temple. Another protective measure could be a rear-temple part which is affixed to the front part of the temple by a connector, which, when unplugged, interrupts the power supply from the battery in the rear part of the temple 2 from its connection to the amplifier in the front part. In this way the rear (battery) part may be plugged into a charger to recharge appropriate batteries.

FIGS. 6, 7, 8, 9 and 10 illustrate the directional hearing, corresponding to natural hearing by means of the directional microphones disposed according to the invention in the eyeglass frame. The unilateral directional characteristic 11 of the microphones 3, supported by the sound shielding effect of the head of the user of the invention, makes possible, in the frequency range above 1 kHz, a hearing, which, despite a certain loss of directional information as well as loss of sensitivity, corresponds to the hearing with a perfect ear.

FIG. 7 illustrates that the sound waves emanating from a sound source 12 reach both the microphones and the users ears, so that for directional hearing the reflections from walls etc., marked 13, 14, 15 and 16 reach the auricle without interference and become fully usable by ear and brain. Also the sound waves reaching the microphones are amplified and therefore correct the hearing loss in the frequency range above 1 kHz in correct space relation.

Figure 8:
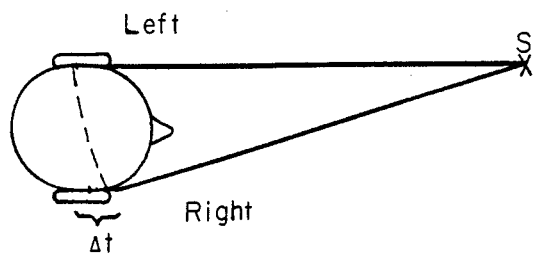
FIG. 8 shows the effect of interaural time differences kept intact with the inventive device FIG. 9 indicates the intactness of the interaural intensity differences FIG. 10 explains pinna transfer functions, which are not distorted by the invention device.

FIG. 8 shows directional information due to interaural time difference.

Figure 9:
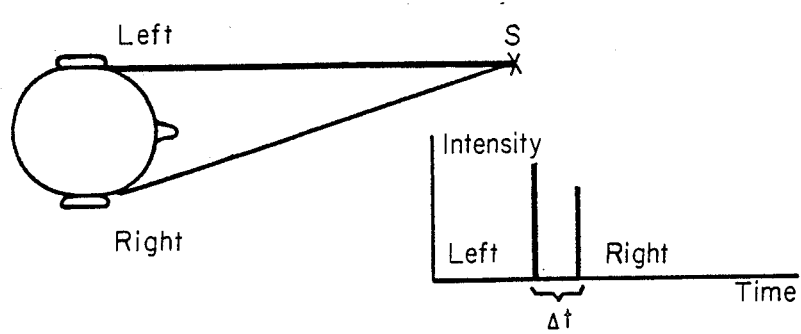

FIG. 9 shows the directional information due to interaural intensity difference.

Figure 10:
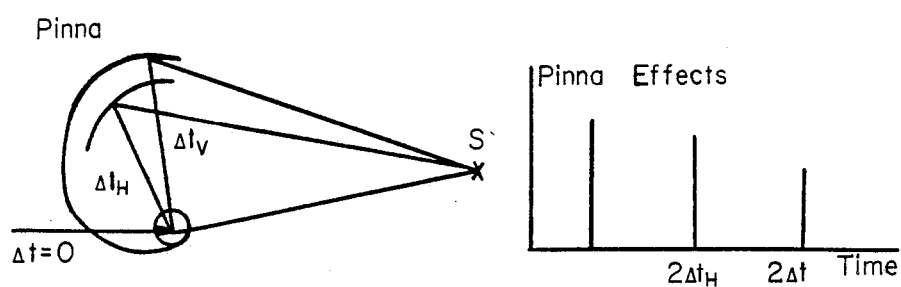

FIG. 10 explains how directional information is extracted from the shape of the pinna, by creating repetitions of the sound signals which are equivalent to the so-called transfer function of the pinna.

For the technical realisation of the invention, miniature printed circuits or IC's with minimal current consumption are available as well as miniature transducers with cobalt samarium or neodym magnets and also miniature microphones with condenser principle or other. With such components it is possible to form elegant temple pieces of low weight and space-saving construction.

With the eyeglass frame according to the invention and the described electroacoustic device, a hearing aid has been created which enables the older person to participate at conferences, communicate at cocktail parties, get safe through street traffic and even enjoy theater, concert and other entertainment again. Use of these hearing eyeglasses may be of advantage to explorers of nature and for military purposes (listening posts).

It is also possible to install solar cells in the temple for the operation of the hearing aid and/or charging the hearing aid batteries.

While a specific embodiment of the invention has been shown and described in detail to illustrate the application of the principles of the invention, it will be understood that the invention may be embodied otherwise without departing from such principles.

What is claimed is:

1. An eyeglass frame with an attached electroacoustical device for enhancement of the sound intelligibility and clarity, the eyeglass frame having a temple mounted to each end of said main frame part on opposite ends of said main frame, each of said temples including an arm portion near a rear end thereof, each temple extending away from said main frame part, and an electroacoustic transducer mounted on each arm portion and oriented to face an outer ear of the wearer, each of said arm portions being positioned so that the transducer lies adjacent the wearer's ear without disturbing entry of lower frequencies naturally into the auditory meatus, including sound reflections from the human pinna of the wearer, a unilaterally directional microphone connected to each of said temples around said front of said main frame each positioned to have a front direction of maximum sensitivity, and a rear direction of minimum sensitivity and having a spacing between said microphones substantially equivalent to the spacing between said transducers and between the ears of the wearer, electronic amplification means having a frequency range of amplification in the range above 1 kHz, mounted to each temple and connected to each unilaterally directional microphone respectively, said transducer of each arm being connected to said electronic amplification means of each respective temple for receiving amplified higher frequency signals from each respective unilaterally directional microphone and transmitting the corresponding amplified sounds to the wearer's respective ears.

2. An eyeglass according to claim 1, wherein said electronic amplification means includes delay means for establishing a delay in transmission time between said directional microphone and its respective electroacoustic transducer, said delay corresponding approximately to a time delay of sound from the front end of a respective temple to the rear end of the respective temple.

3. The combination according to claim 1, wherein said time delay for said electronic amplification means is selected to be about 0.3 ms.

4. The combination of claim 1, wherein said electronic amplification means is selected to have an amplification factor which increases with increasing frequency.

5. The combination according to claim 1, wherein each temple comprises a housing for containing one of said directional microphones and one of said electronic amplification means, each arm connected to one of said housings.

6. The combination according to claim 5, wherein each arm portion is pivotally mounted to a respective housing.

7. The combination according to claim 6, wherein said pivotal mounting comprises said arm made at least partly of a material which is deformable at room temperature.

8. The combination according to claim 1, wherein each temple is pivotally mounted to said main frame part, for pivoting from a folded storage position to an extended use position, said electronic amplification means including a power supply and a switch associated with said frame part and one temple for deactivating said power supply with said temple in its folded position and activating said power supply with said temple in its use position.

9. The combination according to claim 8, wherein said switch includes a pin connected to said electronic amplification means and extending from said temple in its use position for activating said power supply.

10. The combination according to claim 8, wherein said electronic amplification means includes delay means for establishing a delay in transmission time between said directional microphone and its respective electroacoustic transducer, said delay approximately corresponding to a time delay of sound from the front end of a respective temple to the rear end of the respective temple.

11. The combination according to claim 1, wherein said electronic means is selected to have an amplification factor which increases with increasing frequency.

12. The combination according to claim 5, including an electrical connection, said temple having two parts which are connected by said electrical connector with sufficient mechanical stability, said two parts containing in one part at least the power supply and in the other part at least the power consuming elements of said combination.

13. The combination according to claim 1, including a lanyard having interaural electrical conductors connected to said battery housing in place of said battery, and a battery box on the other end of said lanyard, and a battery box clothing pocket for containing said battery.

14. An eyeglass and hearing device according to claim 13, including switch means carried by said main frame being positioned so as to be actuated by pivoting movement of said temple arm to activate and deactivate said microphone.

15. The combination according to claim 1, wherein the directions of maximum sensitivities of the microphones subtend a small acute angle diverging outwardly from the central plane of symmetry.

* * * * *